United States Patent [19]

Lymburner

[11] Patent Number: 4,632,018

[45] Date of Patent: Dec. 30, 1986

[54] FLUID CYLINDER POSITION SENSOR MOUNTING APPARATUS

[76] Inventor: Robert K. Lymburner, 4075 Clinton River Dr., Clinton River Mobile Park, Mt. Clemens, Mich. 48043

[21] Appl. No.: 706,914

[22] Filed: Feb. 28, 1985

Related U.S. Application Data

[63] Continuation of Ser. No. 500,460, Jun. 2, 1983, abandoned.

[51] Int. Cl.[4] .......................... F01B 31/12; G01L 7/00

[52] U.S. Cl. ...................................... 92/5 R; 73/37.6; 73/756

[58] Field of Search ........................ 92/5 R, 5 L; 91/1; 73/37, 37.5, 37.6, 756; 33/DIG. 2

[56] References Cited

U.S. PATENT DOCUMENTS

| | | | |
|---|---|---|---|
| 3,041,880 | 7/1962 | McCarvell et al. | 73/756 |
| 3,414,693 | 12/1968 | Watson et al. | 200/82 |
| 3,463,554 | 8/1969 | Bueler | 92/5 R |
| 3,661,053 | 5/1972 | Rich | 92/5 R |
| 3,691,902 | 9/1972 | Lebzelter | 91/1 |
| 3,848,517 | 11/1974 | Hawke | 92/101 |
| 3,930,413 | 1/1976 | Laird et al. | 73/756 |
| 4,179,982 | 12/1979 | Saotome | 92/5 |
| 4,316,145 | 2/1982 | Tann | 92/5 R |
| 4,414,851 | 11/1983 | Maglic | 73/756 |

FOREIGN PATENT DOCUMENTS

| | | | |
|---|---|---|---|
| 0589310 | 6/1947 | United Kingdom | 73/756 |

*Primary Examiner*—Robert E. Garrett
*Assistant Examiner*—H. Edward Li
*Attorney, Agent, or Firm*—Basile, Wintraub & Hanlon

[57] ABSTRACT

A position sensor mounting apparatus for fluid operated, expansible chamber cylinders includes a housing which receives and supports a position sensor. A coupling member is threadingly engageable with a bore formed in the cylinder. The coupling member is rotatably mounted about the housing such that the position sensor is disposed within the cylinder for detecting the position of the piston within, and the housing and position sensors are rotatable with respect to the coupling member and the cylinder. Seals are provided between the coupling member and the cylinder and between the housing and the coupling member.

6 Claims, 3 Drawing Figures

FLUID CYLINDER POSITION SENSOR MOUNTING APPARATUS

This is a continuation of application Ser. No. 500,460, filed 6/2/83, now abandoned.

BACKGROUND OF THE INVENTION

I. Field of the Invention

This invention relates, in general, to fluid operated, expansible chamber cylinders and, more specifically, to position sensors for fluid operated, expansible chamber cylinders.

II. Description of the Prior Art

Fluid operated, expansible chamber cylinders find widespread usage in machine and other manufacturing equipment. Such cylinders, typically of the compressed air or hydraulic operated type, utilize axial movement of a piston housing within the cylinder to effect a desired action of a working component attached to the external end of a piston rod connected to the piston. Control valves operated by sensors, such as limit switches, are employed to control such cylinders by causing the desired directional movement of the piston at the correct time in the machine sequence.

Since it is often necessary to know when the piston has moved to the fully extended or retracted travel position before the next step in the machine sequence can take place, limit switches have been used to contact the external end of the piston rod or the connected work component at the end of piston travel. However, the use of such externally mounted limit switches encountered several problems since such switches are susceptible to damage in the crowded mechanical environment in which they are located. Furthermore, externally mounted limit switches are bulky and require special mounting arrangements which must be added to the machine.

To overcome these problems, sensors or limit switches have been mounted directly on fluid operated cylinders and sense the position of the piston within the cylinder. Such sensors are contained within a housing mounted directly on the cylinder, typically by fasteners, such as screws or bolts, and extend through a bore formed in the cylinder into proximity with the piston or piston rod.

While the use of sensors mounted directly on the cylinder eliminate many of the problems associated with externally positioned limit switches, they are not without their own disadvantages. Since such sensors are mounted in a single fixed position on the cylinder, the wiring or other connections to remotely located control equipment exit the housing from only one direction or side. This places considerable restraints on the machine designer in mounting a fluid operated cylinder on a machine since he must provide space for such connections in the oftentimes crowded machine environment.

Thus, it would be desirable to provide a fluid operated cylinder position sensor mounting apparatus which overcomes the problems associated with previously devised position sensor mounting apparatuses. It would also be desirable to provide a position sensor mounting apparatus for fluid operated cylinders which permits wiring or other connections leaving the sensor housing to be located in any desired orientation. Finally, it would be desirable to provide a position sensor mounting apparatus for fluid operated cylinders which can be located in any position or angular orientation on the cylinder without requiring removal and reattachment of the sensor on the cylinder.

SUMMARY OF THE INVENTION

There is disclosed a position sensor mounting apparatus for fluid operated, expansible chamber cylinders which includes a housing for receiving and supporting a position sensor on the cylinder. The housing is formed with first and second integral portions of different cross section and an annular shoulder disposed between the first and second portions. A through bore is formed in the housing for receiving and supporting the sensor such that the sensor can be disposed in proximity with the piston or piston rod housed within the cylinder.

A coupling member is rotatably mounted about the housing and is threadingly engageable with the threads formed within a bore in the cylinder for rotatably mounting the position sensor within the bore. The coupling member is formed with first and second integral sections having different cross sections and an annular shoulder disposed between the first and second portions. A bore is formed through the coupling member such that the member may be rotatably disposed about the second portion of the housing.

Seal means are provided between the coupling member and the cylinder and between the coupling member and the housing for providing a fluid-tight seal between the housing, coupling member and cylinder. Preferably, the seal means comprises O-rings which are mounted in annular grooves formed in a shoulder of the coupling member and a shoulder in the housing.

The position sensor mounting apparatus of the present invention overcomes many of the problems associated with previously devised position sensor mounting arrangements. The position sensor mounting apparatus of the present invention provides a threaded, secure connection to the cylinder and, at the same time, enables the housing which receives and supports the position sensor to be freely rotatable with respect to the housing and threaded connection provided by the coupling member. In this manner, the housing may be rotated to any desired orientation with respect to the cylinder and coupling member such that the wiring or other connections exiting the housing for connecting the position sensor to remotely located control equipment may be positioned as desired depending upon the machine configuration. This simplifies the design of the overall machine since the wiring or other connections exiting the housing of the position sensor may be located in any available space without requiring special mounting arrangements.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figures 1, 2, 3:
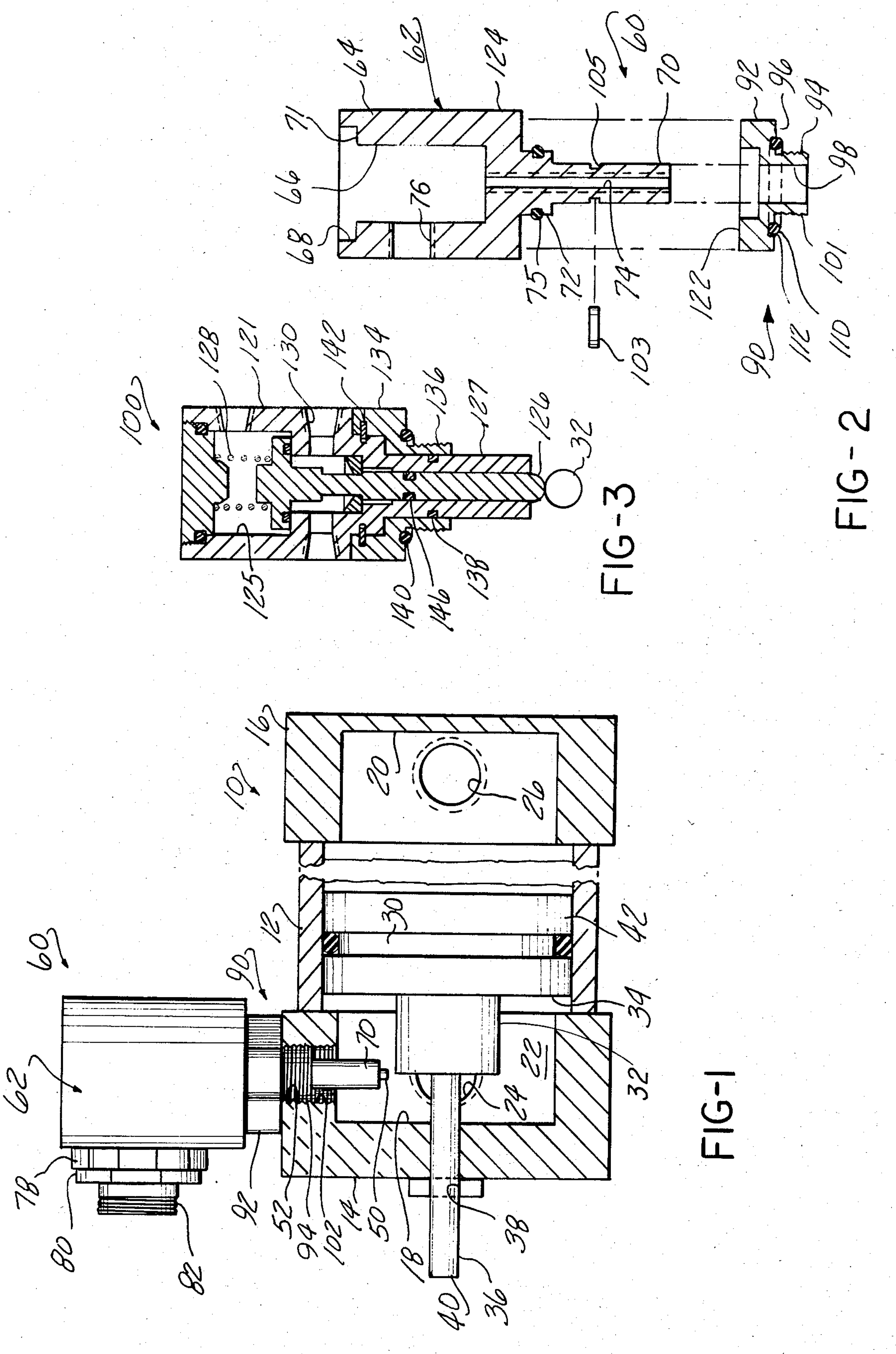
FIG. 1 is a partially sectioned, elevational view of a fluid operated, expansible chamber cylinder having a position sensor and mounting apparatus of the present invention mounted thereon.
FIG. 2 is an exploded, cross-sectional view of the position sensor mounting apparatus of the present invention.
FIG. 3 is a cross-sectional view of a second example of a position sensor mounting apparatus.

Throughout the following description and drawing, an identical reference number is used to refer to the same component shown in multiple figures of the drawing.

Referring now to the drawing, and to FIG. 1 in particular, there is illustrated a fluid operated, expansible chamber cylinder 10 having a position sensor mounted in a mounting apparatus constructed in accordance with the teachings of the present invention. As is conventional, the fluid operated cylinder 10 includes a hollow cylindrical housing 12, typically having a circular cross section. First and second end plates 14 and 16, respectively, are mounted at opposite ends of the housing 12 and are interconnected by means of a plurality of tie rods, not shown. Recessed internal cavities 18 and 20 are respectively formed in the first and second end plates 14 and 16 and communicate with the interior of the cylinder housing 12 to form a sealed internal chamber 22.

A plurality of bores, such as bores 24 and 26, are formed in the end plates 14 and 16, respectively, and provide inlet and exhaust connections to the chamber 22 within the cylinder 10.

A piston 30 is slidingly disposed within the chamber 22 and is axially movable from one end to the other within the chamber 22. An enlarged cushion projection or plug 32 is mounted on the forward face 34 of the piston 30. An elongated piston rod 36 is connected at one of its ends to the cushion plug 32 and is axially movable with the piston 30. The opposite end of the piston rod 36 is slidingly disposed through an aperture 38 formed in the end plate 14 such that an external end 40 of the piston rod may movably extend outward from the cylinder 10. Any working component or part may be connected to the external end 40 of the piston rod 36 to perform any desired operation as the piston 30 moves from one end to the other within the cylinder 10.

In operation, as is well known, a pressurized fluid, such as compressed air or hydraulic oil, may be admitted through the inlet bore 26 into the chamber 22 of the cylinder 10 by means of control valves, not shown. The pressurized fluid acts upon the rear face 42 of the piston 30 to move the cylinder piston 30 to the left, as viewed in FIG. 1. When fluid under pressure is admitted through the bore 24 in the first end plate 14, the fluid acts against the front face 34 of the piston 30 to move the piston 30 toward the end plate 16, thereby retracting the piston rod 36 into the cylinder 10.

A piston position sensor is provided on the cylinder 10. The position sensor, as shown by way of example by reference number 50 in FIG. 1, is typically mounted in a bore 52 formed in the end plate 14. The position sensor is disposed in proximity with the piston rod plug 32 to detect the end point of travel of the piston 30 within the cylinder 10.

Any type of position sensor may be mounted on the cylinder 10. By way of example and not limitation, the position sensor 50 may comprise a pressure operated sensor which detects a buildup of pressure at the end of piston travel. Alternately, a proximity switch, such as that illustrated in FIG. 1, may be mounted within the bore 52 to detect the presence of the cushion plug 32 at the end of the chamber 22 of the cylinder 10. Finally, a plunger type switch, such as shown at 100 in FIG. 3, may be mounted within the bore 52 to detect by actual contact the presence of the cushion plug 32 at the end point of piston travel.

As shown in FIG. 1 and in greater detail in FIG. 2, a unique mounting apparatus 60 is provided for mounting the position sensor 50 within one bore 52 in the end plate 14.

The position sensor mounting apparatus 60 includes a housing 62 which may have a cylindrical or other desired configuration. The housing 62 has a first enlarged portion 64 with an internal cavity 66 formed thereon. A larger diameter bore 68 is formed at the upper end of the cavity 66 and in communication therewith and forms an annular shoulder 71 which receives and supports a removable cap, not shown, for sealing the internal cavity 66.

The housing 62 also includes a second portion 70 which is integrally formed with the first portion 64. The second portion 70 has a smaller diameter than the first portion 64 and forms an enlarged annular section 72 having an O-ring 75. A through bore 74 receives and supports the position sensor 50, as shown in FIG. 1.

A horizontally extending bore 76 is formed in a sidewall of the first portion 64 of the housing 62. The bore 76 is formed with internal threads which receive a threaded plug 78, as shown in FIG. 1. A threaded adaptor 80, which is connected to a wiring plug receptacle or other connector 82, engages the threaded connector 78 to mount the wiring plug receptacle or other connector 82 to the housing 62. In this manner, the wiring or other connections from the position sensor 50 within the housing 62 may be connected to remotely located control equipment for transferring control signals indicative of the position of the piston 30 within the cylinder 10.

A coupling member 90 is provided for fixedly mounting the housing 62 to the cylinder 10. The member 90 includes a first enlarged cross-section portion 92 having external hex flats formed thereon. A second portion 94 is integrally formed with the first portion 92. The second portion 94 has a reduced cross section and forms an annular flat shoulder 96 that carries an O-ring 110.

A step bore 98 is formed through the first and second portions 92 and 94 of the member 90 and is operative to slidingly receive the second portion 70 of the housing 62. In this manner, the second portion 70 of the housing 62 may be rotatably disposed about the coupling member 90, while the O-ring 75 provides a fluid-tight engagement thereinbetween. The coupling member 90 is retained in position on the portion 70 of housing 62 by means of a retainer ring 103 that is engageable with slot 105 formed on portion 70.

External straight threads 101 are formed on at least a portion of the second portion 94 of the member 90 and threadingly engage straight threads 102 formed in the bore 52 in the end plate 14 of the cylinder 10 for securely attaching the member 90 on the cylinder 10. While the member 90 is secured in place and fixed with respect to the cylinder 10, the housing 62 may be rotated to any desired orientation with respect to the cylinder 10. In this manner, the external wiring or other connections exiting the housing 62 through the adaptor 80 and connector 82 may be positioned in any desired orientation for ease in mounting the cylinder on any machine.

The O-ring 110 is mounted within an annular groove 112 formed in the shoulder 96 and serves to form a fluid-tight seal between the coupling member 90 and the external surface of the cylinder 10.

By means of the mounting apparatus 60 described above, any position sensor 50 may be mounted on a fluid operated, expansible chamber cylinder 10 to detect the end point of travel of a piston 30 disposed within the cylinder 10. At the same time, the position sensor, as well as the housing which contains the wiring or other connections to remotely located control equipment, is rotatable with respect to the cylinder 10 such that it can be oriented to any desired position for ease in mounting the cylinder on a machine.

Referring now to FIG. 3, there is illustrated the plunger-type switch 100. Switch 100 is adapted to utilize an air valve sensor. The switch 100 includes a housing 121 having a step bore 125, the lower end of which is cylindrically shaped and adapted to extend into the cylinder bore 52 in the same manner as the sensor 62 described hereinbefore. The lower portion 127 of the housing 121 slidably supports a plunger 126 which is adapted to engage the cushion 32 and be moved upwardly against the bias of a spring 128 disposed within the interior of the housing 121. The upward movement of the plunger 126 permits communication between air ports, one of which is designated by the numeral 130, in the conventional manner to a suitable sensing device to establish that the piston 30 has moved to a desired position. The housing 121 is connected to the cylinder 10 by a coupling member 134 which is similar to the coupling member 90 described hereinbefore. Coupling member 134 includes an outer, lower threaded portion 136 that engages the threaded bore 52 in the cylinder 10. The exterior wall of the cylindrical section 127 of the housing 121 includes an O-ring 138 which functions to sealingly engage the inner wall of a step bore of coupling member 134 to prevent the passage of fluid thereby when the switch 100 is secured to the cylinder 10. O-ring 140 on the lower surface of the coupling member 134 abuts the top surface of the cylinder 10 to cause a fluid seal in the same manner as the seal 110 operates, as described hereinbefore with respect to the fluid sensor 60. The exterior wall of the housing 121 is provided with a slot which is alignable with a corresponding slot on the interior step bore of the coupling member 134 where a retainer ring 142 permits a snap-lock engagement of the two members such that the housing 121 may be rotated with respect to the coupling member 134 to provide proper and simple alignment of the housing ports 130 in any desired orientation. A suitable seal, such as O-ring 146, disposed in a circular groove on the sensing probe 126 provides an appropriate fluid seal.

By use of the position sensor mounting apparatus and switches of the present invention, the design and construction of a machine incorporating fluid operated, expansible chamber cylinders having position sensors mounted thereon is greatly simplified since the designer is free from any restraints in the orientation or position of the connections between the position sensor and remotely located control equipment since such connections may exit the position sensor housing in any direction.

What is claimed is:

1. A position sensor mounting apparatus for attachment to a fluid operated, expansible cylinder of the type having a piston movably disposed within a chamber, and a threaded bore formed in the cylinder in communication with the chamber, the sensor mountable within the bore for detecting the position of the piston, the mounting apparatus comprising:

a housing having a first portion with an internal cavity and a second integral portion having a cross section smaller than the cross section of said first portion, a first annular shoulder formed between the first and second portions of the housing, a through bore formed in the second portion of the housing in communication with the cavity in the first portion, the through bore being adapted to receive and support the position sensor therein;

a coupling member including a first portion with a first cross section and a second integral portion having a second smaller cross section, an annular shoulder formed on the member between the first and second portions;

the coupling member having a bore formed therethrough for receiving the second portion of the housing and rotatably mounting the housing within the coupling member for free rotation within the coupling member without simultaneous longitudinal translation with respect to the coupling member;

a plurality of external threads formed on the second portion of the coupling member adapted to threadingly engage the threaded bore formed on the cylinder to fixedly mount the coupling member on the cylinder;

first seal means disposed between the coupling member and the cylinder for forming a fluid-tight seal therebetween; and second seal means disposed between the coupling member and the housing to form a fluid-tight seal therebetween;

said second portion of said housing including an extension projecting past said plurality of external threads, a groove formed in said extension, a retaining ring snugly engaging said groove, said retaining ring abutting an end of said plurality of external threads; and wherein said retaining ring prevents the separation of said coupling member from said housing while allowing free rotation of said housing relative to said coupling member, and when the plurality of threads are threadingly engaged in the threaded bore formed in the cylinder said retaining ring is hidden and cannot be removed, and the threaded bore on the cylinder positively retains said retaining ring against unintended removal.

2. The mounting apparatus of claim 1 wherein the first seal means is mounted on the annular shoulder of the coupling member.

3. The mounting apparatus of claim 2 wherein the first seal means comprises:

an annular groove formed on the annular shoulder on the coupling member; and an O-ring mounted within the annular groove.

4. The mounting apparatus of claim 1 wherein the second seal means comprises:

an annular groove formed on the second portion of said housing; and an O-ring mounted within said annular groove.

5. The mounting apparatus of claim 1 wherein the external threads formed on the coupling member are straight threads.

6. A position sensor mounting apparatus for attachment to a fluid operated, expansible cylinder of the type having a piston movably disposed within a chamber, and a threaded bore formed in the cylinder in communication with the chamber, the sensor mountable within the bore for detecting the position of the piston, the mounting apparatus comprising:

a housing having a first portion with an internal cavity and a second integral portion having a cross section smaller than the cross section of said first portion, a first annular shoulder formed between the first and second portions of the housing, a through bore formed between the first and second portion of the housing in communication with the cavity in the first portion, the through bore being adapted to receive and support the position sensor therein;

a coupling member including a first portion with a first cross section and a second integral portion having a second smaller cross section, an annular shoulder formed on the member between the first and second portions;

the coupling member having a bore formed therethrough for receiving the second portion of the housing and rotatably mounting the housing within the coupling member for free rotation within the coupling member without simultaneous longitudinal translation with respect to the coupling member;

a plurality of external threads formed on the second portion of the coupling member adapted to threadingly engage the threaded bore formed on the cylinder to fixedly mount the coupling member on the cylinder;

first seal means disposed between the coupling member and the cylinder of forming a fluid-tight seal therebetween; and second seal means disposed between the coupling member and the housing to form a fluid-tight seal therebetween;

a first groove extending radially inward formed in said housing;

a second groove axially aligned with said first groove extending radially outward formed in said coupling member;

a retaining ring snugly engaging said first and second grooves to form an irreversible assembly of said housing and said coupling member and allow rotation of said housing relative to said coupling member.

* * * * *